United States Patent
Frey et al.

(10) Patent No.: US 8,348,624 B2
(45) Date of Patent: Jan. 8, 2013

(54) EFFICIENCY OPTIMIZED AIR FLOW APPARATUS AND METHOD

(75) Inventors: Andrew Carl Frey, Fishers, IN (US); Andrew Martin Placek, Fishers, IN (US)

(73) Assignee: Universal Blower Pac, Inc., Noblesville, IN (US)

( * ) Notice: Subject to any disclaimer, the term of this patent is extended or adjusted under 35 U.S.C. 154(b) by 350 days.

(21) Appl. No.: 12/704,949

(22) Filed: Feb. 12, 2010

(65) Prior Publication Data

US 2011/0200453 A1    Aug. 18, 2011

(51) Int. Cl.
*F04B 49/00* (2006.01)

(52) U.S. Cl. ............. 417/19; 417/22; 417/32; 417/44.2; 417/44.3; 417/44.11; 210/614; 210/143; 210/739; 210/96.1

(58) Field of Classification Search .................. 417/44.2, 417/44.3, 44.11, 53, 14, 19, 22, 32; 210/96.1, 210/143, 614, 739
See application file for complete search history.

(56) References Cited

U.S. PATENT DOCUMENTS

| | | | | |
|---|---|---|---|---|
| 5,050,092 A | * | 9/1991 | Perry | 702/182 |
| 5,269,660 A | * | 12/1993 | Pradelle | 417/18 |
| 5,586,932 A | | 12/1996 | Kiser | |
| 5,709,533 A | * | 1/1998 | Dias | 417/18 |
| 5,736,823 A | * | 4/1998 | Nordby et al. | 318/432 |
| 5,818,194 A | | 10/1998 | Nordby | |
| 6,504,338 B1 | * | 1/2003 | Eichorn | 318/727 |
| 7,143,016 B1 | * | 11/2006 | Discenzo et al. | 703/3 |
| 2007/0012052 A1 | | 1/2007 | Butler | |
| 2009/0230055 A1 | * | 9/2009 | Jenkins et al. | 210/614 |

* cited by examiner

*Primary Examiner* — Devon Kramer
*Assistant Examiner* — Ryan Gatzemeyer
(74) *Attorney, Agent, or Firm* — Brannon Robinson PC

(57) ABSTRACT

A method for controlling the motor of an air handling system to provide a desired output of flowing air therefrom while minimizing the power used by the motor, including operationally connecting a switched reluctance electric motor to a blower, operationally connecting an electronic controller to the switched reluctance electric motor, operationally connecting at least one sensor to the electronic controller, measuring at least one environmental parameter with the at least one sensor, inputting the desired air flow into the electronic controller, calculating the minimum motor speed necessary to provide the desired air flow, and sending a control signal from the electronic controller to the motor to control the motor to the minimum motor speed necessary to provide the desired air flow.

12 Claims, 3 Drawing Sheets

EFFICIENCY OPTIMIZED AIR FLOW APPARATUS AND METHOD

TECHNICAL FIELD

The present novel technology relates generally to air flow control in air handling systems, and, more particularly, to at a method and apparatus for optimizing the efficiency of the air handling system while maintaining constant air flow by a blower operationally connected to the system.

BACKGROUND

Air handling systems, whether residential, commercial, or municipal, typically use a blower to urge air of a predetermined temperature through a duct system to control and maintain the temperature of an enclosure. The blower typically includes a fan operationally connected to a motor. The motor is typically electric. The air handling system is typically required to provide air flow under a variety of conditions, including variable enclosure volume, the temperature of the enclosure, the temperature of the air delivered, the duct geometry, and the like.

Typically, an air handling system is required to provide air at a constant flow rate. A constant flow rate is generally achieved by controlling the speed of the driver motor in response to detected changes in the air flow rate and/or related variables. A number of control paradigms have been developed to control air flow rate by controlling motor speed, the specifics of each tailored to the characteristics of the hardware, desired output, and building environment of the particular air handling system in question.

Typically, the electric motor driving the blower fan is a synchronous and operating at fixed increments of speed, such as 600 RPM, 900 RPM, 1800 RPM, 3600 RPM and the like. In order to effectively operate synchronous motors at speeds other than their incremental options, the motors must be connected to the blower fan via an adaptor, such as a V-belt or the like, whereby the motor speed may be relatively smoothly stepped up or down as desired. The drawback of this approach is that such adaptor systems are somewhat inefficient, costing the system extra energy. Further, such systems contribute to increased noise output and the requirement of sound insulation, more powerful electronic controller capability, and additional control and feedback modules.

Further, the standard electric motors and blowers of existing air handling systems are designed to more or less efficiently operate around a narrow plateau of operating speeds and are typically designed to most efficiently operate around the speeds correlating to the standard and most common air flow demand. When demand spikes, it becomes very inefficient and even stressful to the system to ramp up to meet the sudden increase in demand for air flow, if the motor can even accommodate the demand at all. Thus, it is often necessary to have several independent and redundant air handling systems in place to handle acute, unusually heavy demands. For example, water treatment plants have two, and sometimes three, separate air handling systems in place to handle increased water demand due to heavy rainstorms or morning and evening heavy load times. The drawback of this configuration is that energizing the redundant blower unit often supplies more air flow than is required for the process, resulting in unneeded power consumption. Alternatively, an induction motor and VFD can be used, to adjust the blower airflow and meet process demands However, induction motors operate at less than their optimum efficiency when run at less than full motor load. Also, these motors have a relatively steep efficiency drop as motor speed moves away from the optimal. Finally, there is an added cost to supplying and maintaining several independent blower units for one job.

Thus, there is a need for an air handling system having a motor capable of directly providing variable output speeds and a method and apparatus for controlling the same to optimize the efficiency of the air handling system while providing a constant air flow output. The present novel technology addresses these needs.

SUMMARY

The present novel technology relates to an improved air handling control system. It is an object of the present novel technology to overcome the drawbacks associated with the conventional air handling delivery and control methods. The present novel technology relates generally to an improved air handling control system.

One object of the present novel technology is to provide an improved method of air handling delivery and control. Further objects, features, and advantages will become apparent from a consideration of the following description.

BRIEF DESCRIPTION OF THE DRAWINGS

For a better understanding of the nature and objects of the present novel technology, reference should be made to the following drawings, in which.

DETAILED DESCRIPTION

Figure 1:
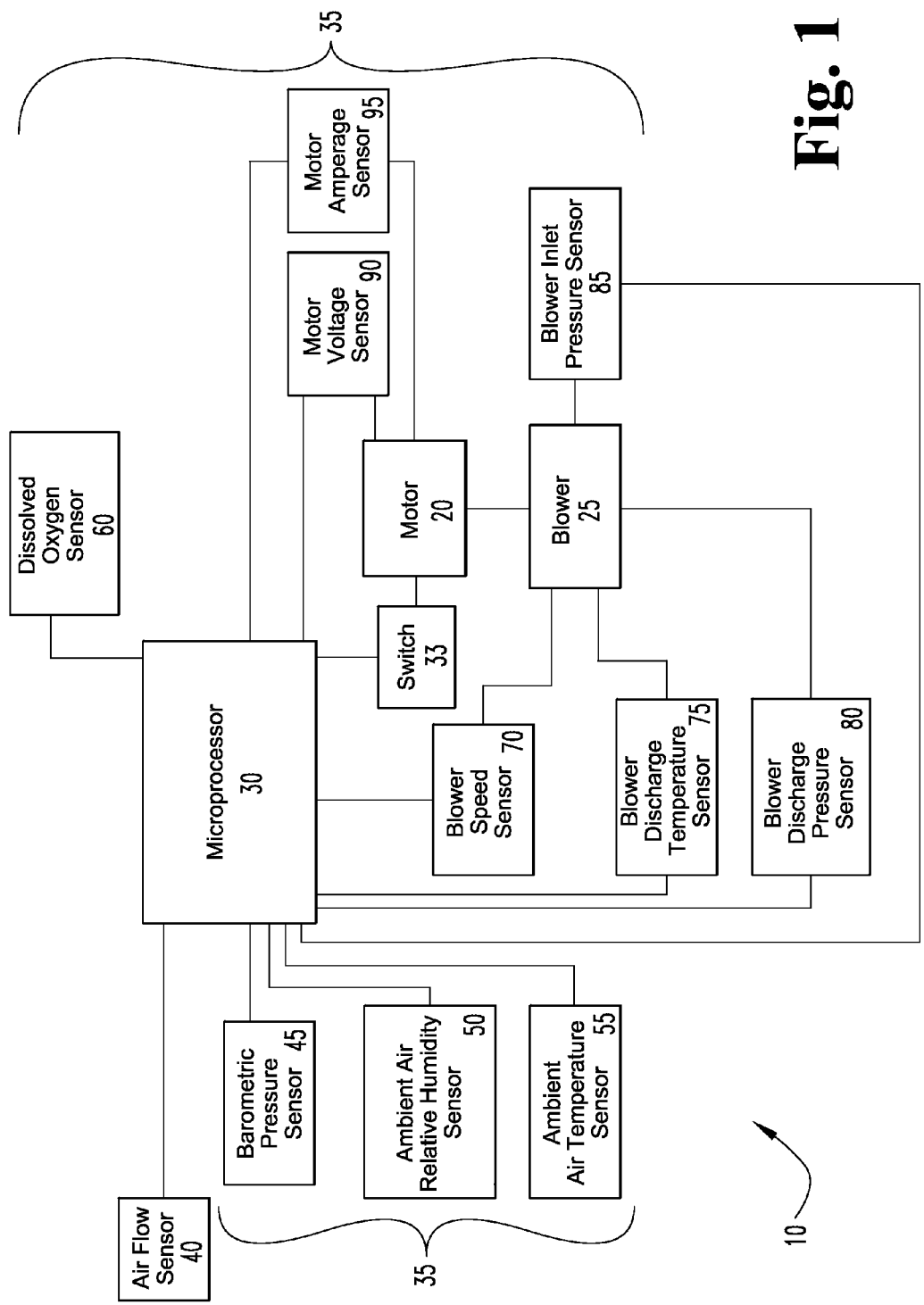
FIG. 1 is a block diagram illustrating a first embodiment of the present novel technology, an apparatus for controlling the operation of a blower to yield increased efficiency.
Figure 2:
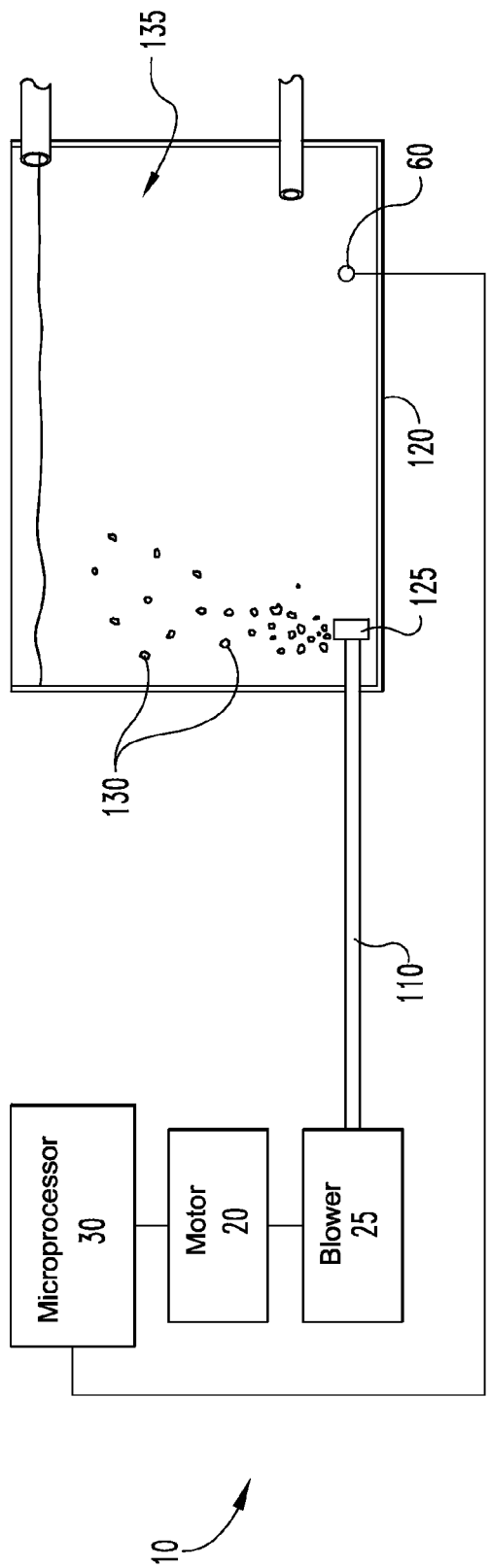
FIG. 2 is a block diagram illustrating the embodiment of FIG. 1 used to provide flowing air in a waste water treatment application.

For the purposes of promoting an understanding of the principles of the novel technology, reference will now be made to the embodiments illustrated in the drawings and specific language will be used to describe the same. It will nevertheless be understood that no limitation of the scope of the novel technology is thereby intended, such alterations and further modifications in the illustrated device, and such further applications of the principles of the novel technology as illustrated therein being contemplated as would normally occur to one skilled in the art to which the novel technology relates.

A first embodiment of the present novel technology is illustrated in FIG. 1, and relates to an air handling system 10 that includes an electric motor 20 operationally connected to a blower 25 and connected in electric communication to an electronic controller or microprocessor 30. In some embodiments, the microprocessor 30 is connected to the motor 20 through switch 33, which is typically connected to a power source (not shown). The electric motor 20 is more typically a switched reluctance motor. One or more sensors 35 are arrayed throughout the system 10 and also electrically connected to the microprocessor 30. The system 10 is typically a 'middle pressure' system, operating to provide an output pressure of between about 4 and about 20 psig.

The sensor array 35 typically may include an air flow sensor 40 positioned to measure the flow rate of the air as urged by the blower 25. Also, the sensors 35 may include a barometric pressure sensor 45 and/or ambient air relative humidity sensor 50 and/or an ambient air temperature sensor 55 and/or a dissolved oxygen sensor 60 and/or the like, each positioned to measure respective properties of the fluid into which the system 10 outputs its flowing air (i.e., ambient air in a building or enclosure, water in a water treatment reservoir, or the like).

The sensor array 35 typically includes a blower speed sensor 70 and/or a blower discharge temperature sensor 75 and/or a blower discharge pressure sensor 80 and/or a blower inlet pressure sensor 85 the like, each positioned to measure respective properties associated with the blower. Likewise, the sensor array 35 typically includes a motor voltage sensor 90 and/or a motor amperage sensor 95 and/or the like, each positioned to measure properties associated with the electric motor 20.

While the system 10 may include an air flow sensor 40 positioned upstream or downstream of the blower 25 for providing a control feedback signal to the microprocessor 30, air flow sensors typically have an error margin of +/−5% or greater. A more precise method of determining air flow is to calculate from the blower motor speed and air parameters that are measureable with greater precision. For example, in one particular embodiment system 10, the motor 20 is a switched reluctance drive motor provided by Switched Reluctance Drives, Ltd., East Park House, Otley Road, Harrogate, UK, HG3 1PR, and the following inputs are received by the microprocessor 30 from the sensor array 35:

| | |
|---|---|
| Relative Humidity ($\Phi$) | % |
| Atmospheric Pressure ($P_{atm}$) | PSIA |
| Pressure drop across inlet filter ($P_{in}$) | Inches Water Column |
| Inlet Pressure at blower flange ($P_1$) | PSIG |
| Inlet Temperature at air inlet ($T_1$) | Degrees Rankine |
| Discharge pressure at blower flange ($P_2$) | PSIG |
| Discharge temperature at blower flange ($T_2$) | Degrees Rankine |
| Motor/Blower Speed (v) and | RPM |
| Standard Pressure ($P_{std}$) | 14.7 PSIA |
| Standard Temperature ($T_{std}$) | 528 Degrees Rankine |
| Standard Relative Humidity ($\Phi_{std}$) | 36% | are given as predetermined values. From these data, ICFM (Inlet Cubic Feet per Minute) may be calculated for the system 10, typically based on proprietary equations provided by the blower manufacturer. These proprietary equations are programmed into the microprocessor 30 and, using these, ICFM is determined. From the ICFM value a conversion to SCFM (Standard Cubic Feet per Minute) is made; the ICFM is essentially a volumetric value while the SCFM is an air mass (or oxygen mass) value. The equation used for the conversion is as follows:

$$SCFM = ICFM * T_{std} * \left( \frac{P_{atm} - P_{sat} * \phi}{T_1 * P_{std}} \right)$$

where $P_{sat}$ is determined from published tables for air based on $T_1$.

In general, for rotary lobe positive displacement blowers the ICFM can be determined using the variables listed above along with a value for the Cubic Feet per Revolution (CFR) and the Slip RPM for a particular blower. Slip RPM is the speed at which 1 PSI of discharge pressure is developed with the discharge. ICFM may thus be expressed as:

$$ICFM = CFR * \left[ \text{Blower Speed} - \text{Slip } RPM * \sqrt{(P_2 - P_1) * \frac{T_1}{T_{std}} * \frac{G_s}{G_a}} \right]$$

Where $G_s$ and $G_a$ are standard specific gravity of air and the actual specific gravity of the process gas, respectively. $G_s$ is given as 1.0. $G_a$ is determined by the following relation:

$$G_a = \left( \frac{P_1 - P_{sat} * \phi}{P_1} \right) * MW_{dry} + \left( \frac{P_{sat} * \phi}{P_1} \right) * MW_{wv}$$

where the MW terms are the molecular weights of the components of the process gas, which consists of dry air and water vapor. Their values are as follows:
$MW_{dry}$=28.964 lbm/lb mol
$MW_{wv}$=18.02 lbm/lb mol An alternate method for calculating SCFM from ICFM follows as:

$$SCFM = ICFM * \left( \frac{P_1}{P_{std}} \right) \left( \frac{T_{std}}{T_1} \right) \left( \frac{1 + \omega_{std}}{1 + \omega_1} \right) \left( \frac{MW_1}{MW_{std}} \right)$$

where $\omega_{std}$ is standard humidity ratio and may be expressed as:

$$\omega_{std} = \left( \frac{\phi_{std} * P_{v_1 sat_{std}}}{P_{std} - \phi_{std} * P_{v_1 sat_{std}}} \right) \left( \frac{MW_{wv}}{MW_{dry}} \right)$$

and $\omega_1$ is inlet humidity ratio and may be expressed as:

$$\omega_1 = \left( \frac{\phi_1 * P_{v_1 sat_1}}{P_1 - \phi_1 * P_{v_1 sat_1}} \right) \left( \frac{MW_{wv}}{MW_{dry}} \right)$$

with $MW_1$ equivalent to $G_a$ above.

In operation, the motor 20 is typically run to provide a constant speed, constant air flow, or varied speed based on a predetermined parameter, such as dissolved oxygen demand. The electronic controller 30 monitors the input from the sensor array 35, calculates the optimum motor speed to provide the required output at a minimum energy use, and automatically controls the motor speed to maximize system efficiency.

Water Treatment Applications

Dissolved oxygen in water treatment is required for the aerobic microorganisms that are used to convert unwanted organic wastes to inert inorganic byproducts. In order for these microorganisms to thrive, the dissolved oxygen content of the water is desired to be maintained above a certain threshold level, typically around 2 mg per liter of water. The actual value in any specific case is predetermined by the treatment facility and is typically measured and verified manually by a laboratory technician. Typically, the technician will go to an aeration basin, remove a water sample, determine the dissolved oxygen content and then determine whether more or less air is being supplied to the tank than is needed to maintain the dissolved oxygen content at an acceptable level.

For water treatment, the system 10 is typically utilized to provide air flow for scouring and backwashing water filters. Scouring and backwashing are typically constant flow applications, wherein pressure may sharply increase or spike upon startup of the air directing ductwork leading from the blower 20 into the water reservoir, until water clears the discharge line. The system 10 may also be connected as part of a pneumatic conveying system for dry chemicals. This configuration would likewise typically be a constant flow application.

For wastewater treatment applications, the system 10 may be connected to provide air for pre-aeration, secondary aeration, more scour and backwash, and mixing. The system 10 is suited for use in applications requiring varying flow and aeration, the blower(s) 25 provides air through a duct or conduit 110 to the bottom of a tank or basin 120, typically through one or more diffusers 125. The diffusers 125 portion the air into small diameter bubbles 130 in order to maximize the surface area of the air volume so introduced into the waste water 135. Diffusion of oxygen into the mixture occurs as the bubbles 130 rise through the waste water 135. The oxygen is used by bacteria in a biological process to break down solid organic wastes and contaminants. Oxygen demand by the process fluctuates regularly due to changes in the amount of influent waste, composition of the influent, and environmental conditions. If oxygen demand drops, less airflow can be provided to the system and operating cost is reduced. Typically the feedback is provided by a dissolved oxygen probe or sensor 60. These are typically constant pressure, variable volume applications.

Typically, mixing applications require a set airflow for a given volume of waste water 135. Air is provided again through diffusers 125, however, these diffusers 125 are configured to produce larger bubbles 130 in order to induce greater fluid displacement and, thus, more thorough mixing. Some oxygen transfer is still required, as there is a biological process occurring, but the main concern is maintaining a homogenous fluid mixture. Effective water volume does fluctuate with the amount of influent, therefore the application is variable volume and variable pressure.

Figure 3:
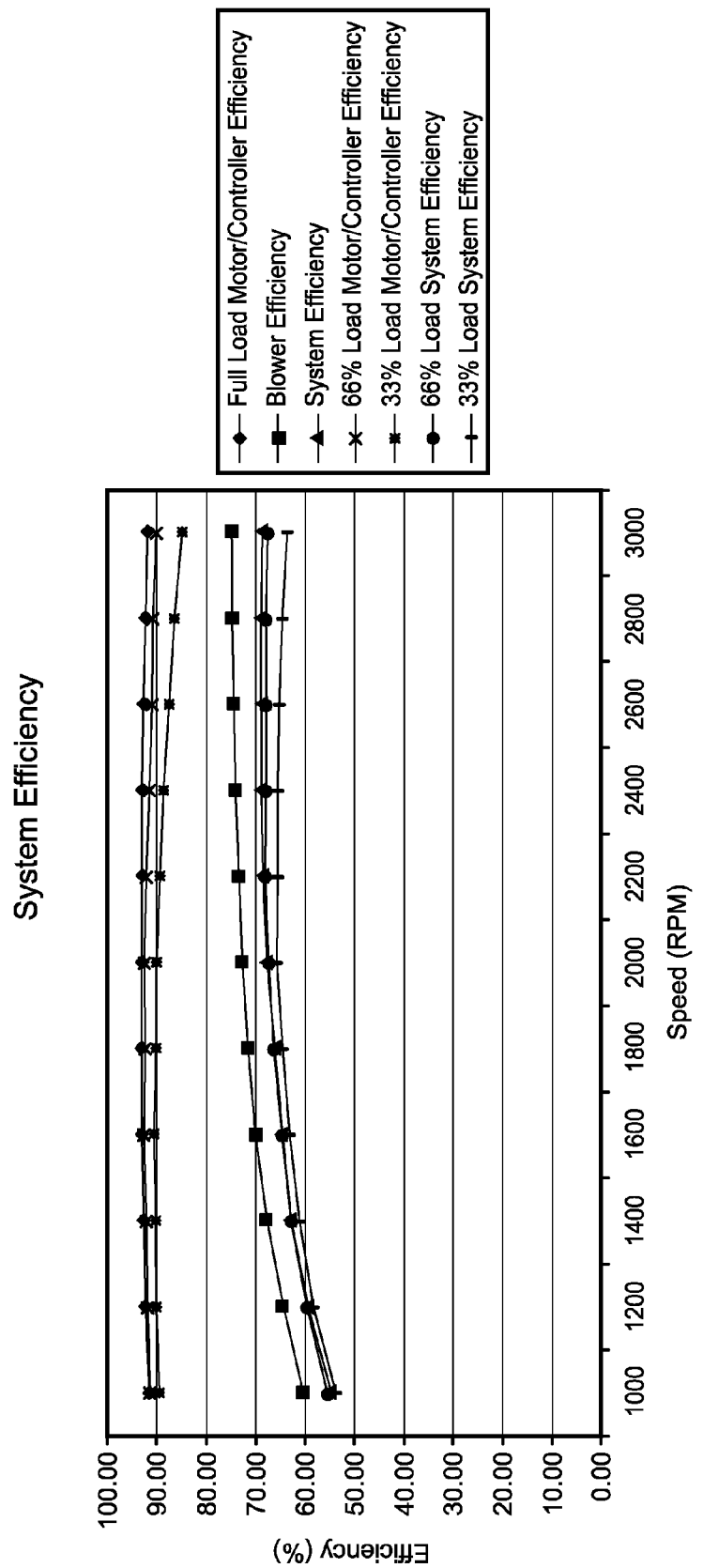
FIG. 3 graphically illustrates the system efficiency of the embodiment of FIG. 1.

Treatment water 135 having a dissolved oxygen content above the value required for the waste-reducing microorganisms to proliferate provides no benefit, and represents an added and unnecessary expense. The system 10 measures the dissolved oxygen content with one or more oxygen sensors 60 positioned in the water reservoir or basin 120 to provide real-time feedback to the microprocessor 30, as well as to system operators, to indicate what adjustments, if any, should be made to provide sufficient, but not excessive, airflow to the water reservoir 120 to maintain the dissolved oxygen concentration at the desired, predetermined level. The system 10 typically receives a signal from the sensor 60 and automatically adjusts the speed of the blower 25 to provide increased or decreased air flow into the water reservoir 120 as indicated by the sensor 60 and determined by the microprocessor 30 to yield sufficient, but not excessive, dissolved oxygen for the waste reducing microorganisms to live in the water reservoir 120. The signal from the sensor 60 is typically a low current signal, more typically in the 4 mA to 20 mA range. This blower 25 may be energized by the motor 20 to run faster or slower to provide increased or decreased air flow depending upon feedback from the dissolved oxygen probe 60 and/or other sensors in the sensor array 35 while maintaining substantially optimum efficiency, without the need of one or more redundant backup blower systems on line. The system efficiency curve plotted as a function of blower speed for various loads is given as FIG. 3.

Other Applications

In a dilute phase pneumatic conveying application, the air handling system 10 is engaged to maintain a minimum airflow velocity for the highest density particle stream. Where particles of lesser density or varying physical characteristics are introduced into the stream, the additional airflow velocity is not required in order to maintain the minimum flow velocity. Energy can be conserved by measuring particle velocity with the sensor array 35, such as via radar or the like, and communicating the particle velocity measurement signal to the microprocessor 30, which then automatically calculates the minimum blower 20 speed necessary to yield the minimum airflow velocity required to maintain the required conveyance speeds. This would be defined as a variable flow and pressure application.

While the novel technology has been illustrated and described in detail in the drawings and foregoing description, the same is to be considered as illustrative and not restrictive in character. It is understood that the embodiments have been shown and described in the foregoing specification in satisfaction of the best mode and enablement requirements. It is understood that one of ordinary skill in the art could readily make a nigh-infinite number of insubstantial changes and modifications to the above-described embodiments and that it would be impractical to attempt to describe all such embodiment variations in the present specification. Accordingly, it is understood that all changes and modifications that come within the spirit of the novel technology are desired to be protected.

We claim:

1. An efficiency-optimized air handling system, comprising:
   a blower having an inlet and an outlet;
   a switched reluctance electric motor operationally connected to the blower;
   an electronic controller operationally connected to the switched reluctance electric motor; and
   a sensor array operationally connected to the electronic controller;
   wherein the sensor array includes sensors for measuring one or more parameters from the set including blower outlet air flow, dissolved oxygen, blower outlet air pressure, blower outlet air temperature, blower inlet air pressure, blower inlet air relative humidity, blower inlet air temperature, blower speed, motor voltage, and motor amperage;
   wherein the electronic controller uses data from the sensor array to calculate an optimal motor speed for providing a desired air flow with minimized power consumption;
   wherein the electronic controller calculates the desired air flow according to the equation $$SCFM = ICFM * \left(\frac{P_1}{P_{std}}\right)\left(\frac{T_{std}}{T_1}\right)\left(\frac{1+\omega_{std}}{1+\omega_1}\right)\left(\frac{MW_1}{MW_{std}}\right)$$

where SCFM represents the desired air flow from the blower outlet, ICFM represents a calculated rate of air volume through the blower inlet, $P_1$ represents blower inlet pressure, $P_{std}$ represents 14.7 PSIA, $T_1$ represents blower inlet air temperature, $T_{std}$ represents 528 Rankine, $\omega_{std}$ represents standard humidity ratio, $\omega_1$ represents blower inlet air humidity ratio, $MW_1$ represents the specific gravity of the gas flowing through the blower and $MW_{std}$ is the molecular weight of air at standard temperature and pressure.

2. The system of claim 1, wherein the sensor array includes a dissolved oxygen probe; wherein the dissolved oxygen probe is positioned in a water treatment basin; and wherein the blower is operationally connected to the water treatment basin for providing the desired air flow thereinto.

3. The system of claim 1 wherein the motor is configured to provide a constant air flow.

4. The system of claim 1 wherein the motor is configured to provide a variable air flow.

5. The system of claim 1 wherein $P_1$ and $T_1$ are measured by the sensor array.

6. The system of claim 1 wherein the electronic controller calculates $\omega_{std}$ according to the equation $$\omega_{std} = \left(\frac{\phi_{std} * P_{v_1 sat_{std}}}{P_{std} - \phi_{std} * P_{v_1 sat_{std}}}\right)\left(\frac{MW_{wv}}{MW_{dry}}\right)$$

where $\Phi_{std}$ represents standard relative humidity of 36 percent, $P_{v1satstd}$ represents the saturation pressure of water vapor at standard temperature, $MW_{wv}$ represents the molecular weight of water vapor and $MW_{dry}$ represents the molecular weight of dry air; and wherein the electronic controller calculates $\omega_1$ according to the equation $$\omega_1 = \left(\frac{\phi_1 * P_{v_1 sat_1}}{P_1 - \phi_1 * P_{v_1 sat_1}}\right)\left(\frac{MW_{wv}}{MW_{dry}}\right)$$

wherein $\Phi_1$ represents the blower inlet relative humidity and $P_{v1sat1}$ represents the saturation pressure of water vapor at the blower inlet.

7. An efficiency-optimized air handling system, comprising:
a blower having an inlet and an outlet;
a switched reluctance electric motor operationally connected to the blower;
an electronic controller operationally connected to the switched reluctance electric motor; and
a sensor array operationally connected to the electronic controller;
wherein the sensor array includes sensors for measuring one or more parameters from the set including blower outlet air flow, dissolved oxygen, blower outlet air pressure, blower outlet air temperature, atmospheric air pressure, ambient air relative humidity, blower inlet air temperature, blower speed, motor voltage, and motor amperage;
wherein the electronic controller uses data from the sensor array to calculate an optimal motor speed for providing a desired air flow with minimized power consumption;
wherein the electronic controller calculates the desired air flow according to the equation $$SCFM = ICFM * T_{std} * \left(\frac{P_{atm} - P_{sat} * \phi}{T_1 * P_{std}}\right)$$

where SCFM represents the desired air flow from the blower outlet, $\Phi$ represents the measured ambient air relative humidity, ICFM represents a calculated rate of air volume through the blower inlet, $P_{atm}$ represents atmospheric pressure, $P_{std}$ represents 14.7 PSIA, $T_1$ represents blower inlet air temperature, $T_{std}$ represents 528 Rankine, and $P_{sat}$ is obtained from look-up tables based on the value of $T_1$.

8. The system of claim 7 wherein $P_{atm}$ and $T_1$ are measured by the sensor array.

9. A system for controlling a switched reluctance electric motor of an air handling system, comprising:
a switched reluctance electric motor;
a blower having an inlet, an outlet and which is operationally connected to the switched reluctance electric motor;
an electronic controller operationally connected to the switched reluctance electric motor; and
a plurality of sensors connected in electric communication with the electronic controller;
wherein the plurality of sensors includes at least one from the set including blower outlet air flow sensors, dissolved oxygen sensors, blower outlet air pressure sensors, blower outlet air temperature sensors, blower inlet air pressure sensors, ambient air relative humidity sensors, blower inlet air temperature sensors, blower speed sensors, motor voltage sensors, and motor amperage sensors;
wherein the electronic controller uses information from the plurality of sensors to control the motor speed to provide a desired air flow and to minimize power drawn by the motor;
wherein the plurality of sensors includes a dissolved oxygen sensor; wherein the dissolved oxygen sensor is positioned in a water treatment basin; and wherein the blower is operationally connected to the water treatment basin for providing the desired air flow thereinto;
wherein the electronic controller calculates the desired air flow according to the equation $$SCFM = ICFM * \left(\frac{P_1}{P_{std}}\right)\left(\frac{T_{std}}{T_1}\right)\left(\frac{1+\omega_{std}}{1+\omega_1}\right)\left(\frac{MW_1}{MW_{std}}\right)$$

where SCFM represents the desired air flow from the blower outlet, ICFM represents a calculated rate of air volume through the blower inlet, $P_1$ represents blower inlet pressure, $P_{std}$ represents 14.7 PSIA, $T_1$ represents blower inlet air temperature, $T_{std}$ represents 528 Rankine, $\omega_{std}$ represents standard humidity ratio, $\omega_1$ represents blower inlet humidity ratio, $MW_1$ represents the specific gravity of the gas flowing through the blower and $MW_{std}$ is the molecular weight of air at standard temperature and pressure; and
wherein $P_1$ and $T_1$ are measured by the sensor array.

10. The system of claim 9,
wherein the electronic controller calculates $\omega_1$ according to the equation $$\omega_1 = \left(\frac{\phi_1 * P_{v_1 sat_1}}{P_1 - \phi_1 * P_{v_1 sat_1}}\right)\left(\frac{MW_{wv}}{MW_{dry}}\right)$$

where $\Phi_1$ represents the measured relative humidity from an ambient air relative humidity sensor, P1 represents measured inlet pressure from a blower inlet air pressure sensor, $MW_{wv}$ represents the molecular weight of water vapor, $MW_{dry}$ represents the molecular weight of dry air and $P_{v1sat1}$ represents the saturation pressure of water vapor at the blower inlet.

11. A method for controlling a switched reluctance electric motor of an air handling system to provide a desired output of flowing air therefrom while minimizing power usage by the motor, comprising:
a) operationally connecting a switched reluctance electric motor to a blower, wherein the blower has an inlet and an outlet;

b) operationally connecting an electronic controller to the switched reluctance electric motor;
c) operationally connecting at least one sensor to the electronic controller;
d) measuring at least one environmental parameter with the at least one sensor;
e) inputting a desired air flow into the electronic controller;
f) calculating a minimum motor speed necessary to provide the desired air flow; and
g) sending a control signal from the electronic controller to the motor to control the motor to the minimum motor speed necessary to provide the desired air flow;
   wherein the at least one sensor includes a blower outlet air flow sensor and further comprising h) adjusting the motor speed in response to the blower outlet air flow;
   wherein the electronic controller calculates the desired air flow according to the equation $$SCFM = ICFM * \left(\frac{P_1}{P_{std}}\right)\left(\frac{T_{std}}{T_1}\right)\left(\frac{1+\omega_{std}}{1+\omega_1}\right)\left(\frac{MW_1}{MW_{std}}\right)$$

where SCFM represents the desired air flow from the blower outlet, ICFM represents a calculated rate of air volume through the blower inlet, $P_1$ represents blower inlet air pressure, $P_{std}$ represents 14.7 PSIA, $T_1$ represents blower inlet air temperature, $T_{std}$ represents 528 Rankine, $\omega_{std}$ represents standard humidity ratio, $\omega_1$ represents blower inlet air humidity ratio, $MW_1$ represents the specific gravity of the gas flowing through the blower and $MW_{std}$ is the molecular weight of air at standard temperature and pressure; and
wherein $P_1$ and $T_1$ are measured by the at least one sensor.

12. The method of claim 11, wherein the electronic controller calculates $\omega_1$ according to the equation $$\omega_1 = \left(\frac{\phi_1 * P_{v_1 sat_1}}{P_1 - \phi_1 * P_{v_1 sat_1}}\right)\left(\frac{MW_{wv}}{MW_{dry}}\right)$$

where $\Phi_1$ represents the measured ambient air relative humidity from a respective ambient air relative humidity sensor, and P1 represents measured blower inlet air pressure from a respective blower inlet air pressure sensor, $MW_{wv}$ represents the molecular weight of water vapor, $MWa_{dry}$ represents the molecular weight of dr air and $P_{v1sat1}$ represents the saturation pressure of water vapor at the blower inlet.

* * * * *